United States Patent
Inoue et al.

(10) Patent No.: US 12,151,621 B2
(45) Date of Patent: Nov. 26, 2024

(54) PERSONAL OVERHEAD DISPLAY STRUCTURE FOR VEHICLES

(71) Applicant: Honda Motor Co., Ltd., Tokyo (JP)

(72) Inventors: Kohei Inoue, Utsunomiya (JP); Patrick J. Ellison, Plain City, OH (US); Taiga Marukawa, Rochester Hills, MI (US); Kosaku Tomozawa, Utsunomiya (JP); Takashi Nakano, Utsunomiya (JP); Akira Futatsuhashi, Utsunomiya (JP); Jagpaul S. Pandher, Plain City, OH (US); Tsuyoshi Higuchi, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 350 days.

(21) Appl. No.: 17/841,885

(22) Filed: Jun. 16, 2022

(65) Prior Publication Data

US 2023/0406225 A1    Dec. 21, 2023

(51) Int. Cl.
*B60R 11/00* (2006.01)
*B60R 11/02* (2006.01)
*B62D 25/06* (2006.01)

(52) U.S. Cl.
CPC ...... *B60R 11/0235* (2013.01); *B60R 11/0229* (2013.01); *B62D 25/06* (2013.01); *B60R 2011/0028* (2013.01); *B60R 2011/0063* (2013.01)

(58) Field of Classification Search
CPC ............. B60R 11/2029; B60R 11/0235; B60R 11/0252; B60R 11/0258; B60R 2011/0028; B60R 2011/0063; B62D 25/06

USPC .......... 296/210, 23.01, 3; 248/343; 348/837, 348/840
See application file for complete search history.

(56) References Cited

U.S. PATENT DOCUMENTS

| | | | |
|---|---|---|---|
| 4,601,511 A | 7/1986 | Nakamura et al. | |
| 5,681,076 A | 10/1997 | Yoshii | |
| 6,543,841 B1 | 4/2003 | Ohkubo | |
| 6,863,326 B1* | 3/2005 | Tiesler | B60R 11/0235 296/210 |
| 7,296,850 B2 | 11/2007 | Kaneda et al. | |

(Continued)

FOREIGN PATENT DOCUMENTS

| | | |
|---|---|---|
| CN | 204506764 U | 7/2015 |
| CN | 206264942 U | 6/2017 |

(Continued)

*Primary Examiner* — Dennis H Pedder
(74) *Attorney, Agent, or Firm* — Plumsea Law Group, LLC

(57) ABSTRACT

An overhead display system for a vehicle is disclosed. The system includes a central strut channel extending across the vehicle ceiling, and front and rear arches also extending across the vehicle ceiling in spaced relation to the central strut channel and in generally parallel relationship thereto. A central bracket has an upward channel attached to the central strut channel and angled surfaces and horizontal surfaces emanating forward and rearward from the central channel. The horizontal surfaces attach to the front strut or the rear strut respectively to provide anchoring stability to the central bracket. Matingly received in the central upward channel is a central fixture which is attached to a display housing at both the front and rear sections. The resulting upside down T-shaped structure provides stability and vibration management to the overhead display mount.

20 Claims, 3 Drawing Sheets

(56) References Cited

U.S. PATENT DOCUMENTS

| | | |
|---|---|---|
| 7,604,286 B2 | 10/2009 | Watanabe et al. |
| 7,903,180 B2 | 3/2011 | Boundy et al. |
| 7,975,350 B2 | 7/2011 | Nagami |
| 8,210,602 B2 | 7/2012 | Kobayashi et al. |
| 9,701,257 B2 | 7/2017 | Vitito |
| 10,061,771 B1 | 8/2018 | Zhang |
| 2005/0116510 A1 | 6/2005 | Leroy et al. |
| 2009/0032665 A1 | 2/2009 | Smith, Jr. et al. |
| 2009/0109352 A1 | 4/2009 | Lewis et al. |

FOREIGN PATENT DOCUMENTS

| | | |
|---|---|---|
| CN | 110040075 A | 7/2019 |
| CN | 209395716 U | 9/2019 |
| CN | 213619590 U | 7/2021 |
| JP | 2012228969 A | 11/2012 |
| KR | 200399669 Y1 | 10/2005 |
| KR | 20130126034 A | 11/2013 |
| KR | 1797535 B1 | 11/2017 |

\* cited by examiner

PERSONAL OVERHEAD DISPLAY STRUCTURE FOR VEHICLES

BACKGROUND

The present disclosure generally relates to a personal display structure, and more particularly, to an overhead structure for vehicles.

Display systems are commonly provided in vehicles today, such as in airplanes, buses, passenger vehicles and minivans. For example, automotive vehicles may be equipped with various electronic entertainment and information systems, sometimes referred to as infotainment systems. Such displays can offer information and entertainment for passengers, including but not limited to mapping and navigation tools, web browsing, video streaming or playback, and video game systems. The displays are typically mounted on a front dashboard of the vehicle or on a rear portion of a seat such as in the back of a front seat headrest or seat back. Such display arrangements are used in conventional vehicles where the vehicle operator and/or passengers are seated in a forward-facing direction.

There is a need in the art for a display system that accommodates non-traditional vehicle seating layouts, in particularly with respect to autonomous vehicles.

SUMMARY

The disclosed embodiments provide methods and systems for an overhead display system in vehicles.

A vehicle has an interior compartment generally defined by a vehicle ceiling, a floor, opposing sidewalls, a forward panel, and a rearward panel. An overhead display system for the vehicle interior comprises at least one overhead display unit and a mounting system attached to the vehicle ceiling for securely holding the display unit. The mounting system includes three parallel struts along the ceiling to retain a bracket assembly. Specifically, the mounting system comprises a central strut channel extending across the vehicle ceiling from sidewall to sidewall, a front arch extending across the vehicle ceiling in relation to the central strut channel and spaced toward the forward panel. The system includes a rear arch extending across the vehicle ceiling in parallel relation to the central strut channel and spaced toward the rearward panel, and a central bracket defining a central upward channel attached to said central strut channel, front and rear angled surfaces extending from a bottom end of the central upward channel, and front and rear stepped horizontal surfaces emanating from the front and rear angled surfaces respectively. In addition, front and rear horizontal attachment plates emanating from the front and rear stepped horizontal surfaces respectively, with the front attachment plate attached to the front arch and attached to an upper edge of a display unit, and the rear attachment plate attached to the rear arch. Another element of the system is a central fixture comprising a central spacer portion attached to a lower edge of the display unit, and a vertical portion matingly received in the central upward channel.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
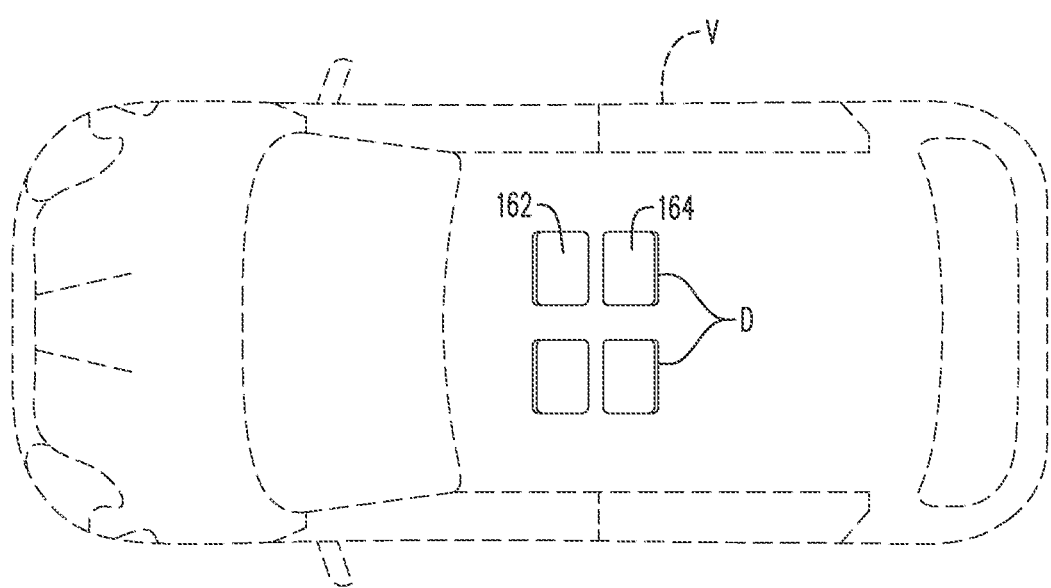
FIG. 1 presents an overhead schematic view of a vehicle roof showing placement of overhead personal displays on the interior ceiling of the vehicle, according to an embodiment.

Modern vehicles are increasingly equipped with display apparatuses. Such displays can provide the passengers with information, such as information about a path to a destination from an origin, and information about the current location of the vehicle. In some cases, the display may playback music or video, provide information about the state of the vehicle, or information for user convenience, such as weather and news. In general, conventional vehicle display systems are designed with the standard seating arrangements found in such vehicles. More specifically, vehicles primarily offer forward-facing seats. Thus, the display systems are constructed based on the premise that passengers will be sitting in an upright position and facing forward.

However, vehicles are increasingly developing modifications in passenger seating arrangements. Autonomous driving aims to reduce or eliminate a human driver's role in driving a vehicle to drastically reduce accidents. Some vehicles, such as those featuring Society of Automotive Engineers (SAE) Level 3+ automated driving capability, will be able to take control of driving, allowing drivers to spend their time in other activities, such as talking to other occupants, listening to song, podcasts or watching videos. When not driving, the drivers may relax by reclining their seats or talking to fellow passengers by swiveling their seat. In fully autonomous (SAE Level 5) vehicles, self-driving system will take full control of driving. With a higher level of automation there is a greater likelihood of unusual interior concept and seat configuration.

Driverless or autonomous vehicles (AVs) may be configured with a passenger compartment including one or more seats that are oriented in various directions. In some cases, the seats can be moved or swiveled from a front-facing position to a rear-facing position for when the vehicle is operating in an autonomous mode. In some other cases, the AV may include a passenger compartment in which the seats are arranged facing toward a center of the vehicle rather than all facing forwards, an arrangement also referred to as "campfire seating". It may be appreciated that such seating arrangements can also make possible the use of a display system that offers forward-facing and rearward-facing passengers viewing access.

Thus, while current display systems generally achieve their intended purpose, there is a need for a new display system that accommodates vehicles designed for passengers who are oriented in the rearward-facing or side-facing position in a vehicle as well as passengers in a forward-facing position. As will be discussed in greater detail below, in some embodiments, an overhead display system can be readily installed in a roof panel of the vehicle. The display system can include mounts for displays that face both forward and rearward. In some embodiments, components of the display system are incorporated into an external trim panel, thereby appearing to extend downward in an aesthetically clean, smooth, and pleasing arrangement to passengers seated below. In addition, in some embodiments, the display system can include a central recessed portion that is pre-configured to receive a drop-in speaker device.

For purposes of introduction, FIG. 1 presents an overhead schematic view of a vehicle roof showing placement of overhead personal displays on the interior ceiling of the vehicle. An exemplary vehicle V is shown in dashed line and four personal overhead displays D are shown schematically in the positions that they might be mounted on the ceiling of the vehicle. For purposes of context, a roof panel and mating ceiling structure may carry the overhead display and support assembly.

Figure 2:
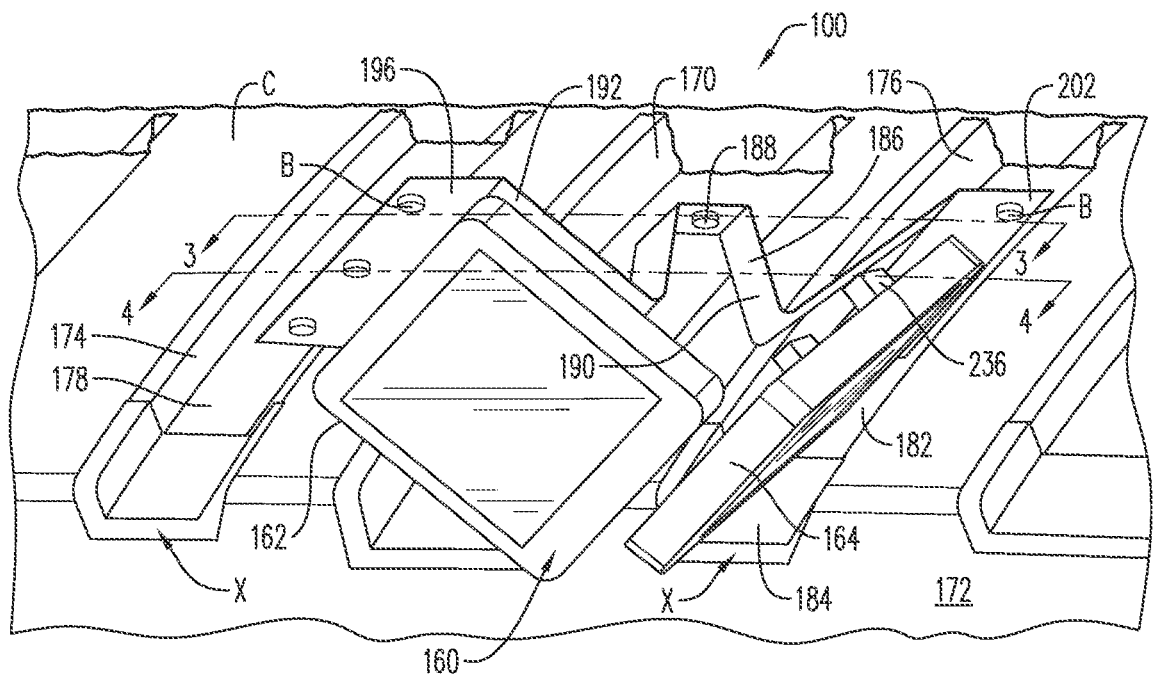
FIG. 2 is a schematic perspective view of a pair of personal overhead displays for a vehicle including an overhead mounting structure, according to an embodiment.

An isolated view of an embodiment of the system 100 is then presented in greater detail in FIG. 2. It can be seen that system 100 includes a plurality of display units 160. A display unit, for purposes of this application, comprises a display case or housing that is configured to receive and securely retain a display device such as a monitor or other type of screen. In other words, while system 100 includes the structures to mount and hold the displays, it does not necessarily include the display devices themselves. In the examples presented herein, the system 100 may include four display units as schematically illustrated in FIG. 1. For convenient reference, display 162 may be referred to as a front display as it is configured for use by a passenger sitting in the front seat, and display 164 may be referred to as a rear display as it is configured for use by a passenger sitting in the rear seat. The front display is forward facing, and the rear display is rearward facing. It will be understood that the directional adjectives are for convenient reference only and not limiting of the disclosure. Consistent with these adjectives, the left-hand end of the vehicle as shown in FIG. 1 is the front end, and the right-hand end of the vehicle is the rear end. Again, these directional adjectives will be used for convenient reference in this description.

Figure 3:
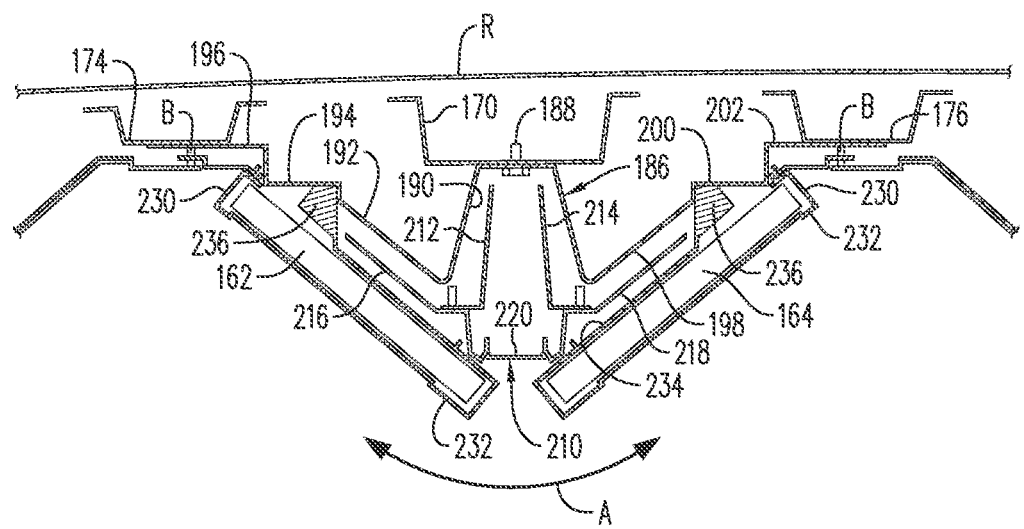
FIG. 3 is a cross section of the personal overhead display structure taken along line 3-3 of FIG. 2.
Figure 4:
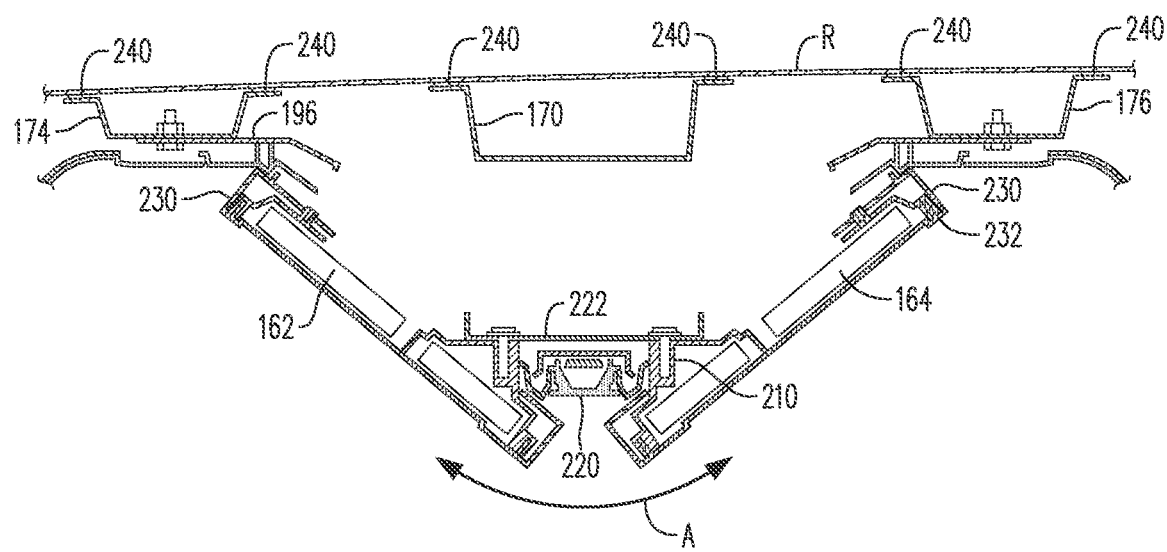
FIG. 4 is a cross section of the personal overhead display structure taken along line 4-4 of FIG. 2.

For clarity of description, FIGS. 2-4 show in detail one pair of display units with the mounting structure, however it will be understood that four display units could be mounted in a similar manner on the other side of the vehicle. Referring now to FIGS. 2-4, display units 160 comprise a first display 162 and a second display 164. For context, the structures illustrated in FIGS. 2-4 can be thought of as illustrating the details of the pair of displays labeled 162 and 164 in FIG. 1. In other embodiments, the system 100 may be configured to include additional display unit pairs that can extend the system a further distance longitudinally along the vehicle roof. The display units 160 can include a display case structure for receiving and retaining a display screen.

FIG. 3 is a cross section of the personal overhead display structure taken along line 3-3 of FIG. 2, and FIG. 4 is a cross section of the personal overhead display structure taken along line 4-4 of FIG. 2. As detailed in these figures, the structural parts of system 100 may comprise, a central body strut channel 170 that may be attached to ceiling C of the vehicle and extend laterally across the vehicle ceiling, perhaps from sidewall to sidewall. Only a portion is shown in FIGS. 2-4 for clarity of illustration. It will be understood that the set of displays mounted next to the illustrated set would have structural features which are the mirror image the ones shown in FIGS. 2-4.

Central body strut channel 170 is attached to ceiling C as well as along the sidewall 172 of the vehicle. In addition to central strut channel 170, system 100 may also comprise a front display arch 174 and a rear display arch 176. In the figures, front display arch 174 is illustrated as having a central portion 178 and a sidewall portion 180. These portions may be connected together and present an integrated arch 174. Front display arch 174 is attached to the ceiling or roof structure in any number of ways which will be apparent to one skilled in the art. Similarly, rear display arch 176 is shown as comprising a central portion 182 and a sidewall portion 184 which cooperatively provide a structural arch for the display system.

The structural portions of the display system comprise therefore, central strut channel 170, front arch 174 and rear arch 176. These three elements may span laterally across the ceiling of the vehicle to provide three structural connection points for the overhead system. As seen in FIGS. 2-4, a central bracket 186 may have an upwardly extending channel 190 which contacts and is connected to central strut channel 170 with a bolt 188. The geometry of central bracket 186 as shown in FIG. 2 is somewhat simplified for clarity, with more details of the cross-sections shown in FIGS. 3 and 4. Referring to the forward portions of central bracket 186, angled from channel 190 is angled support surface 192 from which emanates a first horizontal plate portion 194 which extends to form a horizontal attachment plate 196 which is shown as an extended plate member in FIG. 2 attached to front arch 174. Similarly, rearward portions of central bracket 186 include rear angled support surface 198 from which emanates $1^{st}$ rear horizontal plate portion 200 which extends to form a rear horizontal attachment plate 202 shown as an extended plat member in FIG. 2 attached to rear arch 176. It can be seen then that the overhead display structure includes three attachments, central strut channel 170, front arch 174 and rear arch 176.

As can be seen in FIG. 3, the display unit may include a display housing 230 with an outer housing surface 232 and an inward housing surface 234 surrounding a monitor or the like. Integral to inward housing surface 234 may be a mounting block 236. As seen in FIG. 3, mounting block 236 is configured to engage horizontal surface 200 and angled surface 198 in the rear direction to thereby provide a point of engagement. The front elements are similarly configured for block 236 to engage with surface 194 and angled surface 192 to thereby lock the elements together.

Referring to FIGS. 3 and 4, matingly received in upward channel 190 of central bracket 186 is a central fixture 210. Central fixture 210 comprises a front vertical support strut 212 and a rear vertical support strut 214 attached to front angled strut 216 and rear angled strut 218, attached to a central spacer 220. Spacer 220 spans the distance between display 162 and 164 near their bottom edges, and includes attachment points to display 162 and 164 as shown schematically in FIG. 3. Spacer 220 may resemble a C-channel and may be comprised of more than one piece and is attached to the housings of display 162 and 164. As seen in FIG. 3, portions of central bracket 186 are also attached to front arch 174 and rear arch 176 to provide an integrated, structurally sound attachment which reduces or eliminates unwanted vibration of the displays when the vehicle is in motion. The arch shaped arrow A in FIGS. 3 and 4 illustrate the direction of unwanted vibration that is reduced or brought under management with attachment structure. In FIG. 3 the front arch, rear arch and central strut channel are shown distanced away from roof panel R for illustrative purposes. Also seen in FIG. 3 are attachment hardware bolts B connecting front attachment plate 196 to front arch 174, and rear attachment plate 202 to rear arch 176.

The details of the attachment of central fixture 210 to central bracket 186 may be accomplished by known modes and may accommodate various features of central fixture 210 and the spacer 220 configuration. Among some of the considerations are the accommodation to attach the central fixture to the display housings and provide for structural integrity of same. FIG. 4 shows some additional details of central fixture 210 including a bridge structure spanning the distance between displays 162 and 164 in the area shown by line 4-4 in FIG. 22. Bridge structure 222 connects to the housings for displays 162 and 164 to provide stability and structural integrity to the overhead displays. Again, in FIG. 4, arrow A shows schematically an arc of undesired vibration of the displays which is managed with the structure illustrated herein.

FIG. 4 illustrates central strut channel 170, front arch 174 and rear arch 176 in attached relation to roof R. At the attachment points, a layer of mastic adhesive 240 is interposed between the arches and the roof, or between the central strut channel and the roof. The mastic adhesive may be any type of adhesive used for this type of assembly. Advantageously the adhesive has a resilient quality to contribute to the management of the vibrations of the displays, especially when the vehicle is in motion. While adhesive layer 240 is shown at each attachment point in an equal portion, this is for illustration purposes, and it is within the purview of the disclosure to employ varying amounts of adhesive or to employ the adhesive at less than each connection point of the central strut or arches to the roof structure R. It is also within the purview of the disclosure to employ a combination of adhesive attachment and hardware attachment of the central strut channel and arches to the roof structure R. As illustrated in the figures, each of the central strut channel and the arches are configured with horizontal flanges that contact the roof structure R. While FIG. 4 shows the adhesive attachment points with mastic layers 240, it is also contemplated that bolts or other hardware might be used along the length of each of the central strut channel and the front and rear arches s necessary. Any hardware attachments may include resilient washers or the like to also help manage the unwanted vibration of the displays.

It can be seen that the weight of the display pair is borne by a combination of the central strut channel and the front and rear arches. The multiple connection points introduce improved structural integrity to the system, as well as addressing the unwanted vibrations of the display structure within the vehicle, particularly when the vehicle is in motion. As can be imagined, when the vehicle is in motion, each passenger is viewing the individual display associated with the seat position. With prior attachment structures, it was possible that unwanted vibration of the display occurred which could cause the viewer to experience a motion sickness sensation. In order to manage the unwanted vibration, the structure of the disclosure is provided to reduce the amount of vibration to reduce any undesirable sensory sensations. In some applications, a resonant frequency of 45 Hz or higher has been measured to be a requirement of vibration management of such displays.

As seen in FIGS. 3 and 4, the displays are therefore attached to the system at two points with the advantage of fastening points set in a T-shape as best seen in FIG. 3 where the upward channel 190 forms the vertical leg of a "T" and the spacer 220 and its connected structures form the horizontal portion of a "T" to provide an upside down T-shape configuration to the attachment structure. Attachment of the front and rear arches are marked in FIG. 2 with an "x" and these attachment points may be configured similarly to the attachments shown in FIG. 4 to include a resilient adhesive layer to thereby manage vibration throughout the system. For display 162 for example, the display housing is attached at an upper edge by way of attachment of the display to either angled surface 192 or horizontal plate portion 194 and then attached to the front arch via attachment plate 196. At its bottom edge, display 162 is attached to central fixture 210 which is attached to vertical struts 212 and 214 matingly received in channel 190 of central bracket 186. In this manner, display 162 is attached to the attachment structure at both the upper edge along the ceiling and the lower edge along the spacer area to provide a structurally sound mounting structure that manages unwanted vibration. The attachment of display 164 is accomplished in mirror image, by attachment at its upper edge to plate 200 or angled surface 198, and at its lower edge to the spacer area 210.

It is possible that central bracket 186 may include another upward channel at the other side of display 162 and 164 from what is visible in FIG. 2 to attach the displays to the attachment structure along each side edge thereof.

clarity, the length of the vehicle may be referred to as the longitudinal direction or axis, and the width of the vehicle may be referred to as the lateral direction or axis. As illustrated and described, the central strut channel and the front and rear arches may extend laterally across the ceiling or roof area from sidewall to sidewall to span the entire width of the vehicle. It is also possible that these structural features may span less than the entire width of the vehicle and still accomplish the purpose of providing structural integrity and vibration management to the display mount.

For purposes of this example, the vehicle in which system 100 is installed may be a driver-operated vehicle, a shared autonomous vehicle (SAV), or an autonomous vehicle (AV). In SAVs and AVs, the seating arrangement may allow the vehicle occupants to face each other. As a result, autonomous vehicles may not require components that an individual typically uses to maneuver the vehicle such as, for example, a steering wheel. Moreover, the passenger who is normally seated in the driver's seat may no longer need to be facing forwards towards the front windshield. This is because the occupant seated in the driver's seat no longer needs to view the roadways. As a result, autonomous vehicles can be equipped with flexible seating configurations that allow for the front passengers to rotate their seats into a rearward facing orientation or a side-facing orientation that may be referred to as a campfire style (or a carriage style) seating arrangement of the vehicle.

In some embodiments, the system 100 can be positioned approximately midway between a rearward-facing seat area and a forward-facing seat area. Furthermore, in different embodiments, the displays can be oriented to accommodate varied seating arrangement, and might be multiplied as needed, particularly in a passenger van or bus type of vehicle.

In different embodiments, in order to provide overhead clearance as passengers move through the seating compartment, the system 100 may be shaped and dimensioned to be received within a finished sunken region of the ceiling such that a lowermost portion of each display unit is at or above the level of the surrounding surface of the ceiling panel.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. An overhead display system for a vehicle having an interior compartment defined by a vehicle ceiling, a vehicle floor, opposing sidewalls, a forward panel and a rearward panel, the assembly comprising:
   a display unit; and
   a mounting system attached to the vehicle ceiling on which said display unit is mounted for viewing by a passenger, said mounting system comprising
   a central strut channel extending across the vehicle ceiling from sidewall to sidewall;
   a front arch extending across the vehicle ceiling from sidewall to sidewall in parallel relation to said central strut channel and spaced toward the forward panel;
   a rear arch extending across the vehicle ceiling from sidewall to sidewall in parallel relation to said central strut channel and spaced toward the rearward panel;
   a central bracket defining
      a central upward channel attached to said central strut channel,
      front and rear angled surfaces extending from a bottom end of said central upward channel,
      front and rear stepped horizontal surfaces emanating from said front and rear angled surfaces respectively,
      front and rear horizontal attachment plates emanating from said front and rear stepped horizontal surfaces respectively, said front attachment plate attached to said front arch and attached to an upper edge of said display unit, and said rear attachment plate attached to said rear arch;
   a central fixture comprising a central spacer portion attached to a lower edge of said display unit, and a vertical portion matingly received in said central upward channel.

2. The system of claim 1, further comprising a second display unit having an upper edge attached to said rear attachment plate and connected to said rear arch, and a lower edge attached to said central spacer portion of said central fixture.

3. The system of claim 1, wherein said central strut channel is attached to the vehicle ceiling with mastic adhesive.

4. The system of claim 1, wherein said front arch is attached to the vehicle ceiling with mastic adhesive.

5. The system of claim 1, wherein said rear arch is attached to the vehicle ceiling with mastic adhesive.

6. The system of claim 1, wherein said attachment plate spans a width of said display unit.

7. The system of claim 1, wherein said display unit comprises a display housing connected to said central spacer portion.

8. The system of claim 1, wherein said display unit comprises a display housing connected to said central bracket.

9. A mounting assembly for an overhead display in a vehicle, said assembly comprising:
   a bracket comprising a central upwardly extending channel presenting a horizontal attachment surface;
      a front angled surface extending from a bottom end of said channel upward to form a front attachment plate;
      a rear angled surface extending from an opposite bottom end of said channel upward to form a rear attachment plate, wherein said horizontal attachment surface and said front and rear attachment plates extend to a similar level for attachment to ceiling structures of the vehicle;
   a central fixture comprising a central spacer adapted to be attached to display housings, said fixture having a vertically extending insert portion matingly received in said upwardly extending channel to provide an upside-down T-shaped mounting bracket.

10. The assembly of claim 9, further comprising mastic adhesive layers disposed on said horizontal attachment surface and said front and rear attachment plates to manage vibration of said assembly.

11. The assembly of claim 9, further comprising a central strut channel attached to the vehicle roof for securing said horizontal attachment surface.

12. The assembly of claim 9, further comprising a front arch attached to the vehicle roof for securing said front attachment plate.

13. The assembly of claim 9, further comprising a rear arch attached to the vehicle roof for securing said rear attachment plate.

14. A mounting system for a vehicle ceiling adapted to support an overhead display for viewing by a passenger, said mounting system comprising:
   a front strut adapted to extend laterally across the vehicle ceiling;
   a central strut channel adapted to extend laterally across the vehicle ceiling and spaced from said front strut;
   a rear strut adapted to extend laterally across the vehicle ceiling and spaced from said central strut channel;
   a central bracket having a central portion attached to said central strut, and having a front portion attached to said front strut and a rear portion attached said rear strut;
   a central fixture adapted to be matingly received in said central portion of said central bracket and a spacer portion adapted to be attached to a display housing.

15. The mounting system of claim 14, wherein said central bracket includes a central upward channel and front and rear angled surfaces emanating therefrom.

16. The mounting system of claim 15, wherein said central bracket further comprises horizontal attachment plate portions at the front and rear ends thereof.

17. The mounting system of claim 14, wherein said central fixture comprises a central bridge portion extending between said front and rear angled surfaces.

18. The mounting system of claim 17, wherein said central fixture is attached to said front portion and said rear portion of said central bracket.

19. The mounting system of claim 14, further comprising a mastic adhesive on said central strut channel.

20. The mounting system of claim 19, further comprising a mastic adhesive on said front strut and said rear strut.

\* \* \* \* \*